(12) United States Patent
Scheidhammer et al.

(10) Patent No.: US 11,458,483 B2
(45) Date of Patent: Oct. 4, 2022

(54) SOLID-BOWL CENTRIFUGE SCREW

(71) Applicant: Flottweg SE, Vilsbiburg (DE)

(72) Inventors: Matthias Scheidhammer, Vilsbiburg (DE); Manfred Meyer, Bodenkirchen (DE)

(73) Assignee: Flottweg SE, Vilbiburg (DE)

( * ) Notice: Subject to any disclaimer, the term of this patent is extended or adjusted under 35 U.S.C. 154(b) by 565 days.

(21) Appl. No.: 16/486,192

(22) PCT Filed: Feb. 14, 2018

(86) PCT No.: PCT/DE2018/100133
§ 371 (c)(1),
(2) Date: Aug. 15, 2019

(87) PCT Pub. No.: WO2018/149455
PCT Pub. Date: Aug. 23, 2018

(65) Prior Publication Data
US 2020/0055059 A1    Feb. 20, 2020

(30) Foreign Application Priority Data
Feb. 15, 2017   (DE) .................... 10 2017 103 069.7

(51) Int. Cl.
*B04B 1/20* (2006.01)
*B65G 33/14* (2006.01)
*B65G 33/24* (2006.01)

(52) U.S. Cl.
CPC .............. *B04B 1/20* (2013.01); *B65G 33/14* (2013.01); *B04B 2001/205* (2013.01); *B04B 2001/2041* (2013.01); *B04B 2001/2083* (2013.01); *B65G 33/24* (2013.01)

(58) Field of Classification Search
CPC .............. B04B 1/20; B04B 2001/2041; B04B 2001/205; B04B 2001/2083; B65G 33/14; B65G 33/24
USPC ............................................... 494/53, 54, 55
See application file for complete search history.

(56) References Cited

U.S. PATENT DOCUMENTS 3,642,139 A * 2/1972 Wilson ..................... D21C 9/18
210/380.1
4,449,967 A * 5/1984 Caldwell ................... B04B 1/20
494/54
4,496,340 A    1/1985 Redeker et al.
5,584,791 A * 12/1996 Grimwood ................ B04B 1/20
494/53

FOREIGN PATENT DOCUMENTS

CN    1152264    6/1997
CN    2551345    5/2003
(Continued)

OTHER PUBLICATIONS

DE 2907318 Description Espacenet Machine Translation.*
(Continued)

*Primary Examiner* — Walter D. Griffin
*Assistant Examiner* — Shuyi S. Liu
(74) *Attorney, Agent, or Firm* — Gerald E. Hespos; Michael J. Porco

(57) ABSTRACT

A solid-bowl centrifuge screw is provided and has a screw flight with a profiled flight cross-sectional area. The screw flight has plural layers applied sequentially by build-up welding.

11 Claims, 5 Drawing Sheets

(56) References Cited

FOREIGN PATENT DOCUMENTS

| | | |
|---|---|---|
| CN | 201500591 | 6/2010 |
| CN | 203750711 | 8/2014 |
| DE | 29 07 318 | 8/1980 |
| DE | 2907318 A1 * | 8/1980 |
| DE | 2 924 047 | 1/1981 |
| DE | 32 16 393 | 3/1983 |
| DE | 33 90 482 | 1/1996 |
| DE | 693 1 4 910 | 3/1998 |

OTHER PUBLICATIONS

German Office Action dated Dec. 12, 2017.
International Search Report dated May 29, 2018.
Chinese Office Action dated Jan. 6, 2021.
Indian Office Action dated Mar. 23, 2021.

* cited by examiner

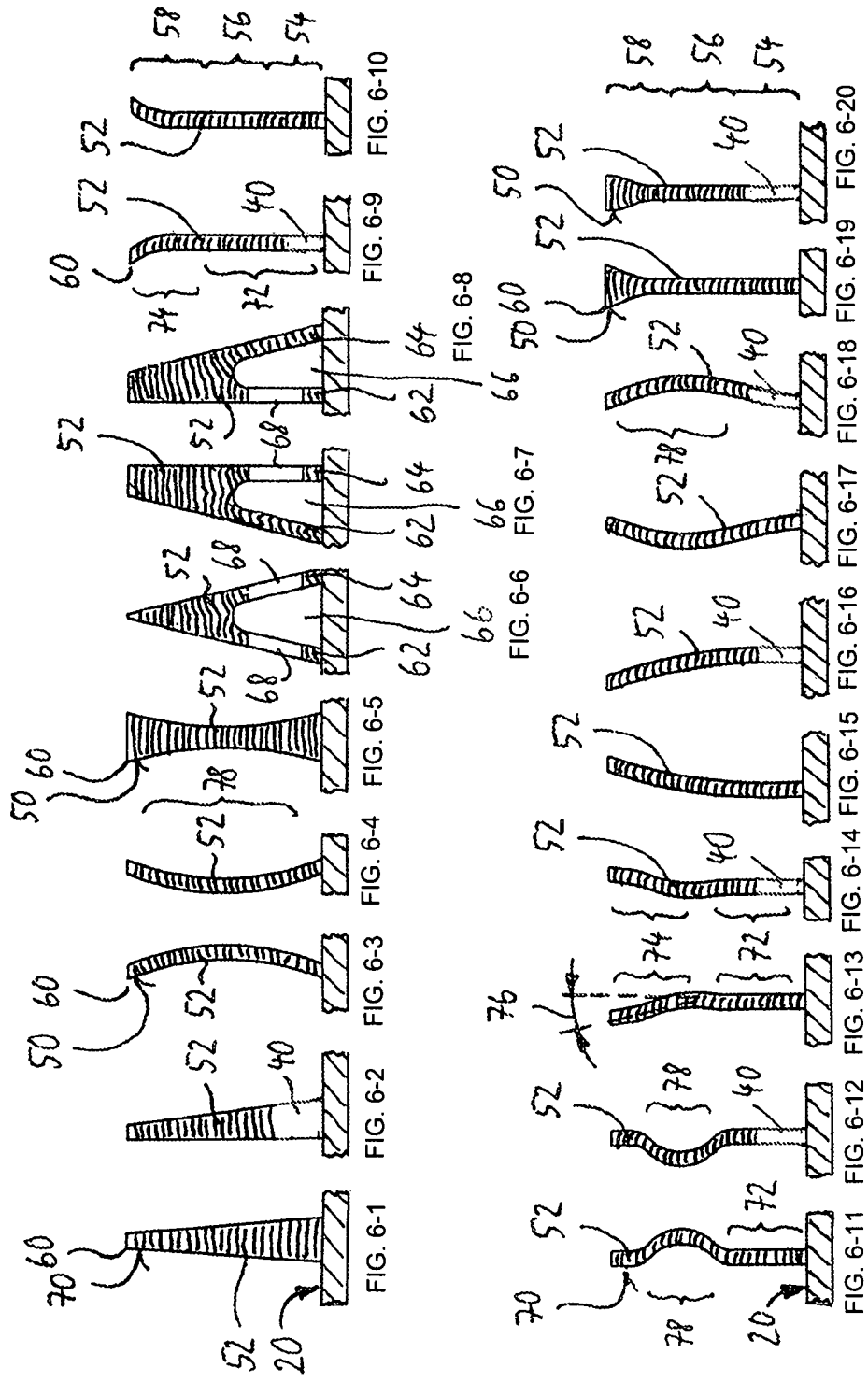

SOLID-BOWL CENTRIFUGE SCREW

BACKGROUND

Field of the Invention

The invention relates to a solid-bowl centrifuge screw having a screw flight. The invention furthermore relates to a production method of such a solid-bowl centrifuge screw.

Related Art

Known solid-bowl centrifuge screws comprise a rotating drum and a drum arranged therein. The solid-bowl centrifuge screw usually has a hollow-cylindrically shaped or tube-shaped screw hub at which a screw flight is embodied. The screw flight usually extends as a sheet metal wound at the outside around the screw hub. The sheet metal thereby protrudes radially to the outside approximately at a right angle so far that the screw flight almost contacts the drum surrounding it.

When the drum is rotating, the likewise rotating screw flight dips into a phase mixture present within the drum. From the phase mixture, the screw flight conveys a heavy or denser first phase that is separating radially to the outside. A lighter or less dense, second phase meanwhile accumulates radially on the inside. Depending on the field of application, the heavy first phase often comprises particularly heavy solids such as earth, sand and stones.

Especially with such heavy, granular solids, the load on the solid-bowl centrifuge screw is very large in coaction with the high rotational speeds of the drum.

The invention is based on the task of creating a solid-bowl centrifuge screw that securely withstands these loads in all operating states and that can simultaneously be produced particularly cost-efficiently.

SUMMARY

The invention relates to a solid-bowl centrifuge screw having a screw flight that has a profiled flight cross-sectional surface. The invention further is directed to a production method of a solid-bowl centrifuge screw, in which the screw flight of the solid-bowl centrifuge screw is designed to have a profiled flight cross-sectional surface.

According to the invention, the screw flight of a solid-bowl centrifuge screw is not designed as a wound sheet metal, which, as such, would have a constant thickness and, viewed accordingly in the cross-section, would represent a rectangle. The screw flight instead is designed in a target manner with a profiled flight cross-sectional surface that is designed to be of different thickness in the radial direction.

With the flight cross-sectional surface profiled in this way, the screw flight can be adapted section by section to its static and dynamic load situations in a target manner. In so doing, it is possible to create a screw flight, which, with the same or even lower costs, withstands higher loads and also has longer service lives with low material expenditure and also low production effort.

The flight cross-sectional surface of one embodiment has a flight foot that is thickened as compared to a flight neck. The thickened flight foot forms a statically stable connection for a flight neck and flight head protruding radially outside from that location. The flight neck can thereby be thinner than in the case of conventional screw flights. The screw flight, as a whole, also may taper radially to the outside.

The flight cross-sectional surface of one embodiment further has a rounding, skew or bevel at the transition to a screw hub. The transition from the screw hub to the screw hub, which is designed concavely and simultaneously round in this way, decreases the notch effect otherwise prevailing at this location and thus increases the static and dynamic strength at that location. The screw flight may be coupled to the screw hub by a welding-related direct connection.

The flight cross-sectional surface may have a flight foot with two supporting webs directed mostly radially, and a free space located therebetween. Viewed in the cross-section, the supporting webs thus quasi form two legs, which lead to a higher stability of the screw flight arrangement of this kind. The arrangement of this kind can furthermore be designed to have particularly little material consumption. A simultaneously small mass of the overall arrangement also follows with the comparatively little material. This design is particularly advantageous with regard to the acceleration behavior of the overall arrangement.

At least one of the supporting webs may be penetrated by at least one passage opening. The passage opening further reduces the resulting overall mass. The passage opening can advantageously further be used in a target manner for the guide-through of clarified goods and for the guide-through of control fluids.

The at least one passage opening in certain embodiments is formed only in the supporting web facing away from the scraping side of the screw flight. The screw flight thus is designed holohedrally on its scraping side, while an additional support is created on its rear side by means of broken supporting webs. This support is simultaneously particularly light or low in mass.

The flight cross-sectional surface may further extend with a first portion in the radial direction and is inclined with a second portion to the radial direction of the screw. Viewed in the cross-section, the screw flight of this kind thus has a flight head that is inclined in the axial direction. The inclined flight head can be used in a targeted manner to achieve a pushing conveying effect that is directed radially to the inside, or to achieve a scraping effect or a pulling scraping effect that is directed radially to the outside, by means of the screw flight. The angle of inclination or the tilt of the flight head to the radial direction is thereby preferably between 5° and 45°, in particular between 7° and 30°.

At least one portion of the flight cross-sectional surface may be curved in the radial direction. Thus, a bowl is created with the curved cross-sectional form, which, at a radial distance to the axis of rotation of the drum, transports a phase deposited at that location in front of it so as to be accumulated in a targeted manner. This bowl furthermore creates an additional reinforcement within the screw flight, which is otherwise largely only aligned radially to the outside.

The flight cross-sectional surface on the solid-bowl centrifugal screw according to the invention further may have a flight head that is thickened as compared to a flight neck. The thickened flight head forms a type of scraping edge, which has an additionally reinforcing effect. The scraping edge may be provided with a wear-resistant coating.

The screw flight according to the invention may be produced by shaping build-up welding. More particularly, the screw flight according to the invention may be produced by means of welding with an active, reactive welding gas or with an inert welding gas as the shaping build-up welding. Such welding methods are also referred to as MAG or MIG welding or as welding with active gas or inert gas. As a whole, such methods are referred to as protective gas metal arc welding (MSG). Such welding methods are defined in the EN ISO 4063 standard: process 135 and 131.

A welding gas from certain subgroups of welding gases is selected according to the invention in a targeted manner. Pursuant to the DIN EN ISO 14175 standard, welding gases are classified into the main groups I, M1 M2, M3, C, R, N, O and Z. From the welding gases of these main groups, preferably only such welding gases are selected which fall into the main groups I, M1, M2 and N. According to the invention, other welding gases are intentionally exempted, since these welding gases are not target-oriented for the solution aimed at according to the invention as has been shown according to the invention.

Main group I comprises welding gases having nominal 100 percent by volume of argon (subgroup 1), nominal 100 percent by volume of helium (subgroup 2) and nominal 0.5 to 95 percent by volume of helium, as well as a remainder of argon (subgroup 3). These welding gases are completely inert.

Main group M1, subgroup 1, comprises welding gases having nominal 0.5 to 5.0 percent by volume of carbon dioxide, nominal 0.5 to 5.0 percent by volume of hydrogen, as well as a remainder of argon or helium. These welding gases are slightly oxidizing and only slightly reducing. Main group M1, subgroup 2, comprises welding gases having nominal 0.5 to 5.0 percent by volume of carbon dioxide, as well as a remainder of argon or helium. These welding gases are slightly oxidizing. Main group M1, subgroup 3, comprises welding gases having nominal 0.5 to 3.0 percent by volume of oxygen, as well as a remainder of argon or helium. These welding gases are likewise slightly oxidizing. Main group M1, subgroup 4, comprises welding gases having nominal 0.5 to 5.0 percent by volume of carbon dioxide, nominal 0.5 to 3.0 percent by volume of oxygen, as well as a remainder of argon or helium. These welding gases are again slightly oxidizing.

Main group M2, subgroup 0, comprises welding gases having nominal 5.0 to 15.0 percent by volume of carbon dioxide, as well as a remainder of argon or helium. These welding gases are slightly oxidizing. Main group M2, subgroup 1, comprises welding gases having nominal 15.0 to 25.0 percent by volume of carbon dioxide, as well as a remainder of argon or helium. These welding gases are likewise slightly oxidizing. Main group M2, subgroup 2, comprises welding gases having nominal 3.0 to 10.0 percent by volume of oxygen, as well as a remainder of argon or helium. These welding gases as well are still slightly oxidizing. Main group M2, subgroup 3, comprises welding gases having nominal 0.5 to 5.0 percent of carbon dioxide, nominal 3.0 to 10.0 percent by volume of oxygen, as well as a remainder of argon or helium. Main group M2, subgroup 4, comprises welding gases having nominal 5.0 to 15.0 percent by volume of carbon dioxide, nominal 0.5 to 3.0 percent by volume of oxygen, as well as a remainder of argon or helium. Main group M2, subgroup 5, comprises welding gases having nominal 5.0 to 15.0 percent by volume of carbon dioxide, nominal 3.0 to 10.0 percent by volume of oxygen, as well as a remainder of argon or helium. Main group M2, subgroup 6, comprises welding gases having nominal 15.0 to 25.0 percent by volume of carbon dioxide, nominal 0.5 to 3.0 percent by volume of oxygen, as well as a remainder of argon or helium. Main group M2, subgroup 7, comprises welding gases having nominal 15.0 to 25.0 percent by volume of carbon dioxide, nominal 3.0 to 10.0 percent by volume of oxygen, as well as a remainder of argon or helium. These welding gases are also comparatively slightly oxidizing.

Main group N, subgroup 1, comprises welding gases having nominal 100 percent by volume of nitrogen. Main group N, subgroup 2, comprises welding gases having nominal 0.5 to 5.0 percent by volume of nitrogen, as well as a remainder of argon or helium. Main group N, subgroup 3, comprises welding gases having nominal 5.0 to 50.0 percent by volume of nitrogen, as well as a remainder of argon or helium. Main group N, subgroup 4, comprises welding gases having nominal 0.5 to 1.0 percent by volume of hydrogen, nominal 0.5 to 5.0 percent by volume of nitrogen, as well as a remainder of argon or helium. Main group N, subgroup 5, comprises welding gases having nominal 0.5 to 50.0 percent by volume of hydrogen, as well as a remainder of nitrogen. These welding gases are all of a slow reaction, are inert with a high content of argon or helium, and are only slightly reducing even at an increasing hydrogen content.

In summary, welding gases are selected according to the invention in a targeted manner, which are inert, slightly oxidizing and/or slightly reducing. As has been shown according to the invention, a method that uses shaping build-up welding, one can work with a low-oxidation weld bead and largely without slag. Thus, the welding seams or weld beads may be superimposed in a particularly well positively locking and firmly bonded manner and adhering to one another. Moreover, one can work at a particularly rapid welding speed enabling short manufacturing times. The actual advantage of the rapid welding speed is that the screw hub and already applied weld beads are only slightly selectively heated during welding. Thus, only little distortion or deformation is generated. But the particular advantage of the procedure according to the invention surprisingly is that such a build-up welding results in a particularly high wear resistance of the thereby produced flight surface.

The welding gas includes a portion of carbon dioxide of nominally less than twenty percent by volume. Such a low content of carbon dioxide allows structural steels to be processed by means of pulsed welding in an advantageous manner according to the invention. At the same time, a comparatively high combustion of the welding wire is possible. This results in a high mass build-up during welding and a particularly rapid operation. A welding gas that includes a portion of oxygen of nominally less than three percent by volume also may be used. Such welding gases have a particularly low oxidizing effect. Furthermore, welding gases including a high portion of argon are particularly cheap.

The protective gas welding device according to the invention may be operated using a pulsed electric arc. Such a pulsed electric arc permits the melting of the welding wire to be precisely controlled at the protective gas welding device. Moreover, the heat input into the workpiece can be kept particularly low in a targeted manner, and deformation caused by temperature can be kept particularly low.

The electrical welding current of the pulsed electric arc welding device of this kind preferably features a base current of less than 200 Amperes and a pulse current greater than 200 Amperes. Such welding currents are advantageous in a particularly precise material build-up at a comparatively low melting performance. A welding gas having nominal 98 percent by volume of argon and nominal 2 percent by volume of carbon dioxide is thereby used as the welding gas.

The protective gas welding device according to the invention may be operated using a short electric arc, in particular an energy-reduced short electric arc. Such a method using a short electric arc is also referred to as cold-arc, consequently, a method using a particularly cold electric arc. For achieving a nevertheless powerfully melting electric arc, a boosted melting pulse is worked with in a particularly advantageous manner.

The first welding layer may be wider than the second welding layer during build-up welding. This may be achieved by operating the protective gas welding device at a higher welding current during the application of the first welding layer than during the application of the at least one second welding layer. Alternatively, for the first welding layer, welding can be done in an oscillating manner, at slower welding speed or at higher wire feed rate. Using such a procedure, the first welding layer is realized to have a particularly strong or great mass application. The first welding layer of such a great volume is then superimposed by a second welding layer which has less volume and consequently is narrower. Altogether, a rounded base or foot is produced at the base body of the workpiece, which base body has few notch effect and thus high rigidity.

The protective gas welding device may be operated using one welding wire, or using two welding wires (twin welding method) having a diameter from 0.5 mm to 3.0 mm, preferably from 10 mm to 16 mm. Surprisingly, such a welding wire diameter has been found to result in high welding speed and, at the same time, in a particularly low thermally caused deformation. Particularly preferred are single welding films or welding layers having a width of 6 to 7 mm. Especially, a welding ribbon of rectangular cross-section is advantageous.

The base body of the workpiece according to the invention may be moved during the manufacture of the metallic workpiece. Along with the movement, the workpiece is oriented during this at its welding site such that an optimum position is achieved for the applied welding layer. In doing so, the welding layer is applied in a particularly preferred manner to a horizontal surface. It is also advantageous for the welding layer to be applied to a surface slightly rising in the welding direction. The angle of inclination is preferably between 5° and 15°, advantageously between 7° and 10°. The base body is correspondingly and advantageously moved such that a horizontal welding surface or a welding surface slightly rising in the welding direction of the protective gas welding device is present at the welding site of the protective gas welding device.

The screw flight may have a varying flight pitch in the longitudinal direction of the screw. Such a varying flight pitch allows the speed of the material transport, in particular the transport of the heavy phase, to be adjusted in the longitudinal direction of the screw as required. A small flight pitch improves the material transport for a solid which is difficult to transport. Such a varying flight pitch, which is advantageous according to the invention, can be produced by means of the shaping build-up welding in a particularly rapid and simple manner at high variability and low labor expenditure. Merely, different pitch ranges need to be input into a data processing device controlling an automatic welding device.

The shaping build-up welding enables a multi-coil screw flight to be produced in a rapid, easy and cost-effective manner. Such a multi-coil flight comprises a plurality of congruent helical curves or helices as flights, which are offset relative to one another in their thread pitch. A screw flight having a multi-coil flight enables a great axial movement to be generated at comparatively small rotation. This allows a particularly rapid material transport to be achieved in the longitudinal direction of the screw flight.

The screw flight may further be provided with a balancing weight that also is produced by shaping build-up welding. With such a balancing weight, uneven mass distributions and constructional unbalances at the screw flight and at the screw hub associated therewith can be compensated. The individual balancing weight may be welded to the screw flight in a particularly precise manner with respect to the site and size. In addition, the balancing weight build-up welded in this way is particularly stably applied to the screw flight as a result of the firmly bonded material application. The balancing expenditure is thus considerably reduced. In particular at the high rotational speeds prevailing during the operation of solid-bowl screw centrifuges, such a stable and locally precise arrangement of the single balancing weight is of great benefit. Imbalance and vibrations caused thereby would otherwise affect almost all of the components by a multiple load.

The screw flight may have a varying flight pitch in the longitudinal direction of the screw. Such a varying flight pitch allows the speed of the material transport, in particular the transport of the heavy phase, to be adjusted in the longitudinal direction of the screw as required. A small flight pitch provides for a highly precise material transport per time unit. In addition, a small flight pitch is advantageous in particular in the case of particularly heavy material, because a correspondingly lower expenditure of force is then required for such a material transport. This does not only spare the wear of the screw flight, but the components supporting the screw also suffer significantly less wear. Such a varying flight pitch, which is advantageous according to the invention, can be produced particularly quickly and easily with high variability and low labor expenditure by means of the shaping build-up welding. Only different pitch ranges need to be input into a data processing device controlling an automatic welding device.

The screw flight may have at least one passage opening that completely permeates the screw flight and that also is produced by shaping build-up welding. Such a passage opening enables a considerably faster and more energy-saving evacuation of the lighter phase present radially inside as compared to an evacuation by means of a screw flight without passage opening. Without passage opening, the light phase present radially inside must flow off along all of the windings of the screw flight against a transport direction of the heavy phase present radially outside. This path along the windings is considerably longer as compared to a path the light phase has to cover upon passing the at least one passage opening. According to the invention, the passage opening of this kind preferably may have been recessed within the flight surface already during the shaping build-up welding of the screw flight. The screw flight is thus producible in only one working step in a particularly fast and cost-effective manner.

Moreover, a disc with damming effect in the form of a baffle plate, submerged disc or flotation disc is formed at the screw flight in an advantageous manner according to the invention, which disc is likewise produced by means of shaping build-up welding. A disc manufactured in such a way can be mounted especially to the associated screw hub in a particularly stable, simple and cost-efficient manner. In this case, the disc having a damming effect preferably is mounted to the screw hub where no flight blade is arranged. Particularly preferred, the disc with damming effect is present at a conical portion of the screw hub, behind which only heavy phase is to be evacuated in the discharging direction of the heavy phase. The disc with damming effect thereby ends with its diameter radially further inside than the drum and thus serves as a weir for preventing the lighter phase present radially inside from being moved onward in the discharging direction of the heavy phase.

Further, a scraper may be formed at the screw flight and also may produced by shaping build-up welding. Produced in such a way, the scraper is likewise particularly cost-efficient to produce and particularly stable during operation. It is precisely such a scraper that needs to be particularly stable and be able to withstand high force impacts. At an end area of the screw flight situated in the discharging direction of the heavy phase, the scraper has the function to scrape off the heavy phase, in particular solids, from the screw flight.

The invention furthermore relates to a production method of a solid-bowl centrifuge screw, in which the screw flight is produced by means of shaping build-up welding.

BRIEF DESCRIPTION OF THE DRAWINGS

FIGS. 6-1 through 6-20 are variants of detail VI according to FIG. 2.
FIG. 7 is a first variant of view VII according to FIG. 5.
FIG. 8 is a second variant of view VII according to FIG. 5.
FIG. 9 is a third variant of view VII according to FIG. 5.
FIG. 10 is a fourth variant of view VII according to FIG. 5.

DETAILED DESCRIPTION

Figure 1:
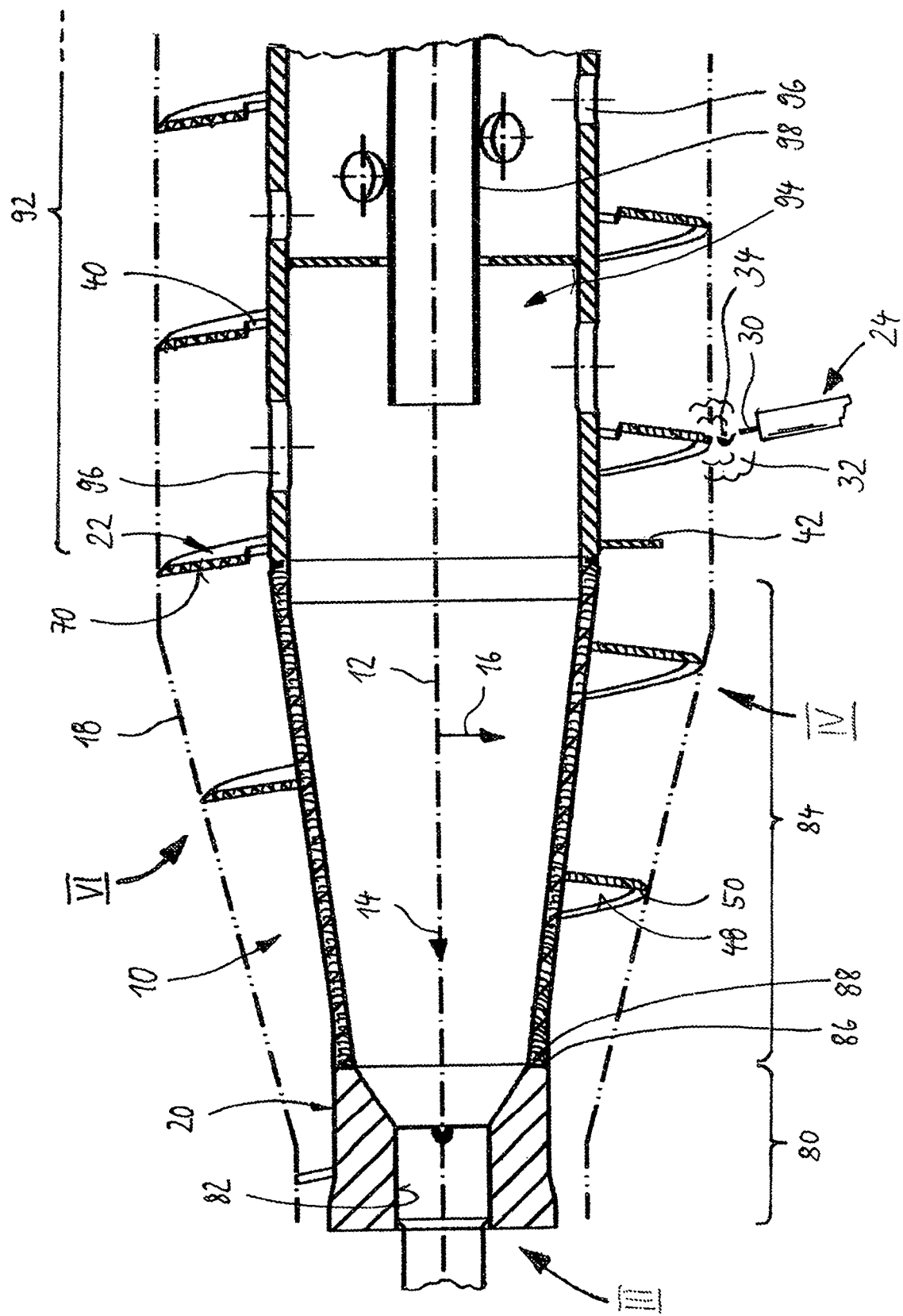
FIG. 1 is a first part of a longitudinal section of a solid-bowl centrifuge screw according to the invention.
Figure 3:
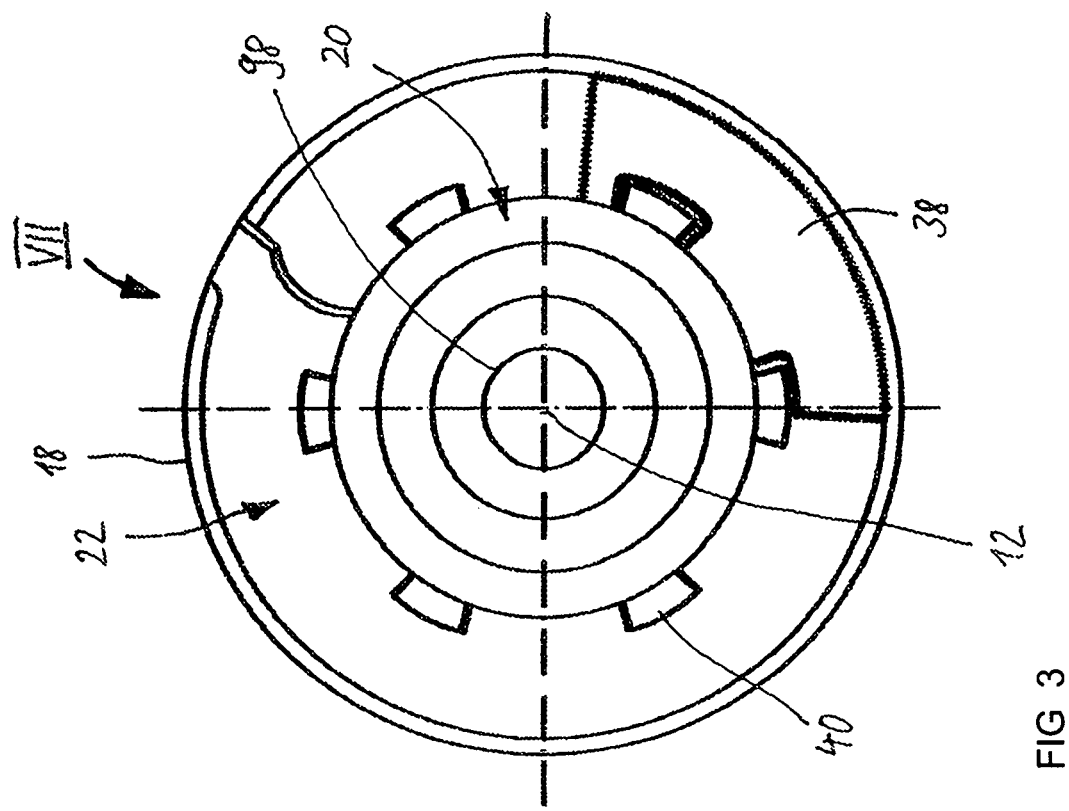
FIG. 3 is a side view of cutout III according to FIG. 1.

In FIGS. 1 to 10, a screw 10 of a solid-bowl screw centrifuge is illustrated which is to be produced as a workpiece mentioned here. The screw 10 includes a rotational axis 12 defining an axial direction 14 and a radial direction 16.

The screw 10 is surrounded by a drum 18 and serves the purpose of discharging from a phase mixture (not shown) within the drum 18 a heavy phase in the axial direction 14. The screw 10 is designed to have a central screw hub 20 and a screw flight 22 surrounding the same in a helical shape.

Further, a protective gas welding device 24 is provided by means of which the screw flight 22 is produced in shaping build-up welding. For this purpose, a first welding layer 26 is applied to the screw hub 20 and then a second welding layer 28 is applied to said first layer by means of the protective gas welding device 24. Moreover, further welding layers have been applied in this way on top of each other or upon each other. Thus, a two-dimensional helical element or a screw-shaped surface has been generated which forms the screw flight 22.

When the screw flight 22 is produced in this way by shaping build-up welding, the screw hub 20 serves as a first base body and is moved during production. The screw hub 20 is in particular rotated about its rotational axis 12 while the protective gas welding device 24 is at the same time displaced in the axial direction 14 and is in this case raised gradually in the radial direction 16.

The protective gas welding device 24 comprises a welding wire 30 and is operated in the MSG method with a protective gas 32. Presently, the protective gas 32 is selected from one of the subgroups of the main groups I, M1, M2 or N of DIN EN ISO 14175 standard and includes a portion of carbon dioxide of nominally less than twenty percent by volume as well as a portion of oxygen of nominally less than three percent by volume. Thereby, an electric arc 34, which is realized in the present case as a pulsed electric arc, is generated by means of the protective gas welding device 24.

The screw flight 22 may in this way be realized particularly easily and at low cost to be of low warpage and at the same time particularly wear-resistant. In particular, a multi-coil flight may also be produced in a simple manner. The screw flight 22 may also be designed to have a flight pitch 36 varying in the axial direction 14 or in the longitudinal direction of the screw 10 and thus is differently sized.

By means of the shaping build-up welding, a balancing weight 38 may further be produced at the same time on the screw flight 22. By means of single welding spots and/or larger accumulations of welding material, the balancing weight 38 may be dimensioned individually and precise in location. The balancing effort is thus considerably reduced.

The screw flight 22 further is to be provided with various passage openings 40 in a very simple manner and without metal cutting processes, since it is produced by means of shaping build-up welding.

Also, a disc 42 having a damming effect is at the same time produced on the screw flight 22 by shaping build-up welding. The disc 42 may act as a baffle plate but also as a submerged disc or flotation disc.

Furthermore, a scraper 44 is also molded to the screw flight 22 at its end area on the screw hub 20 by means of shaping build-up welding.

Figure 4:
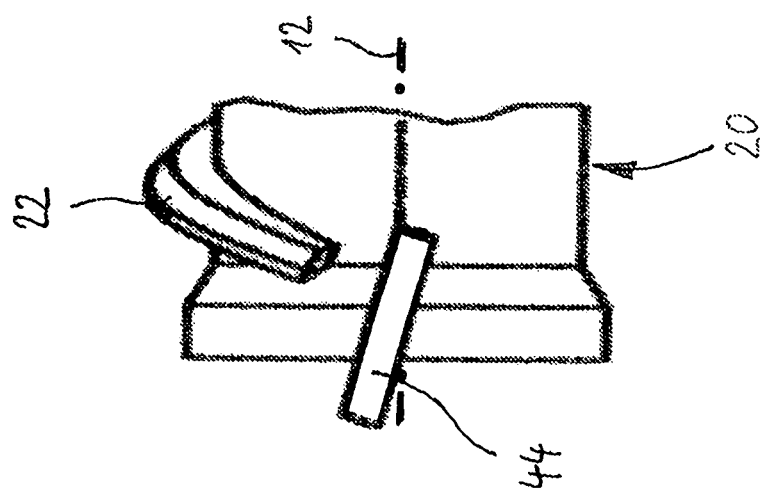
FIG. 4 shows a detail IV according to FIG. 1 in an enlarged representation.

A transition 46 from the screw hub 20 to the screw flight 22 is designed shaping build-up welding as a rounding, skew or bevel. For this purpose, the first welding layer 26, as illustrated in FIG. 4, is produced to be wider than the second welding layer 28 arranged above. The wider welding layer 26 is in particular produced using a higher welding current, an oscillating welding method or a lower welding feed rate.

A lateral flight surface 48 of the screw flight 22 has been mechanically post-processed after its production by means of build-up welding. However, such a post-processing is not absolutely necessary. Optionally, a wear-resistant coating 50 of tungsten carbide has been produced on the flight surface 48. This coating has also been produced as a single layer by build-up welding by means of the protective gas welding device 24.

The cross-sectional flight surface 52 of the screw flight 22 is advantageously formed in various variants according to FIG. 6 to be profiled. In this case, the cross-sectional flight surface 52 includes, radially inside, a flight foot 54, radially further outside, a flight neck 56, and radially furthest outside, a flight head 58.

Figure 2:
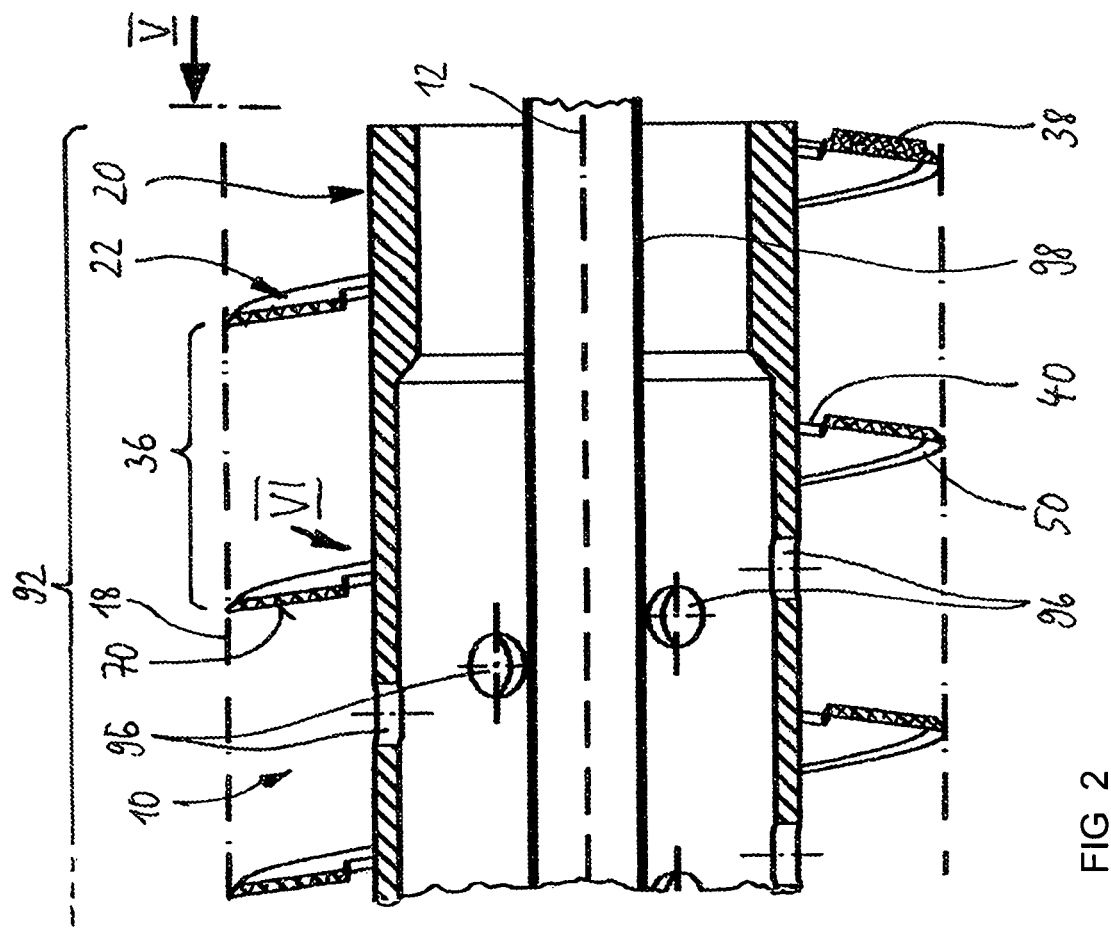
FIG. 2 is a second part of the longitudinal section according to FIG. 1.
Figure 5:
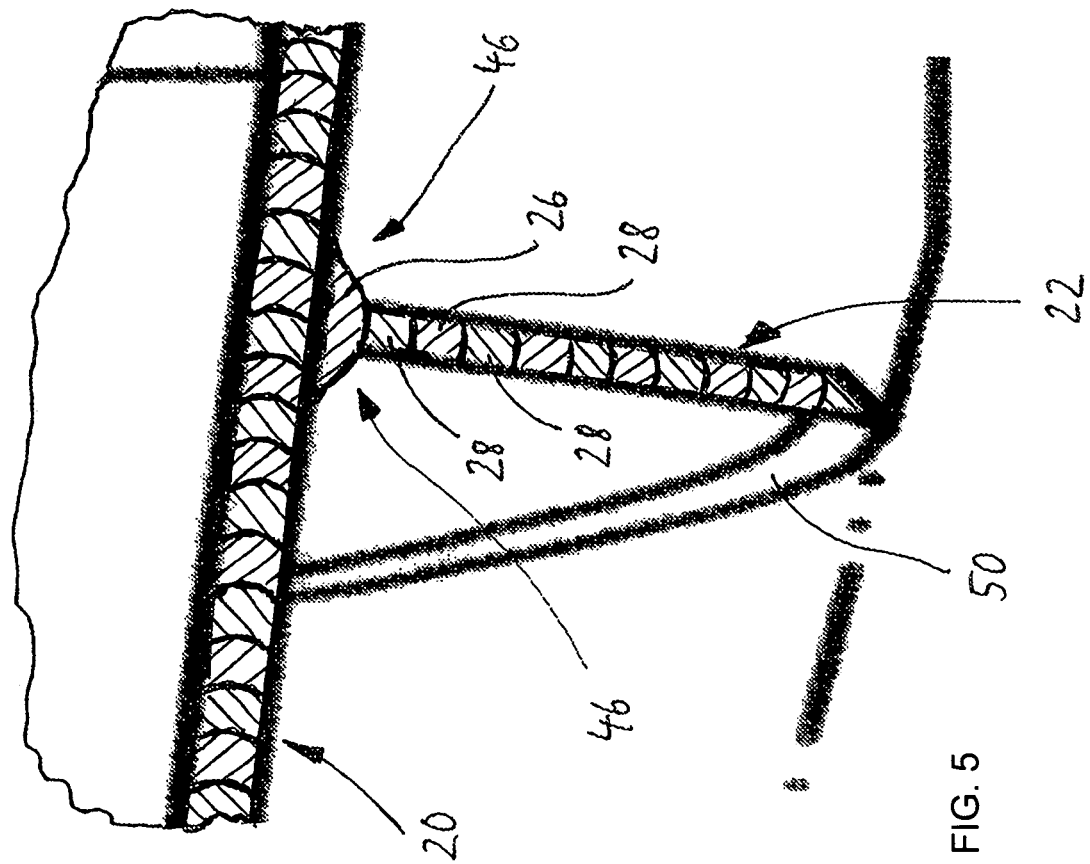
FIG. 5 is a top view V according to FIG. 2.

The cross-sectional flight surface 52 is designed according to the two variants in FIGS. 6-1 and 6-2 to be tapering radially to the outside in the radial direction 16. According to a variant in FIGS. 6-5, 6-19 and 6-20, the profiled cross-sectional flight surface 52 has a flight head 58 which is designed to be thickened in the axial direction 14.

In several variants, a scraping edge 60 axially inclined toward the scraping direction and carrying the coating 50 is formed on the flight head 58.

Figure 7:
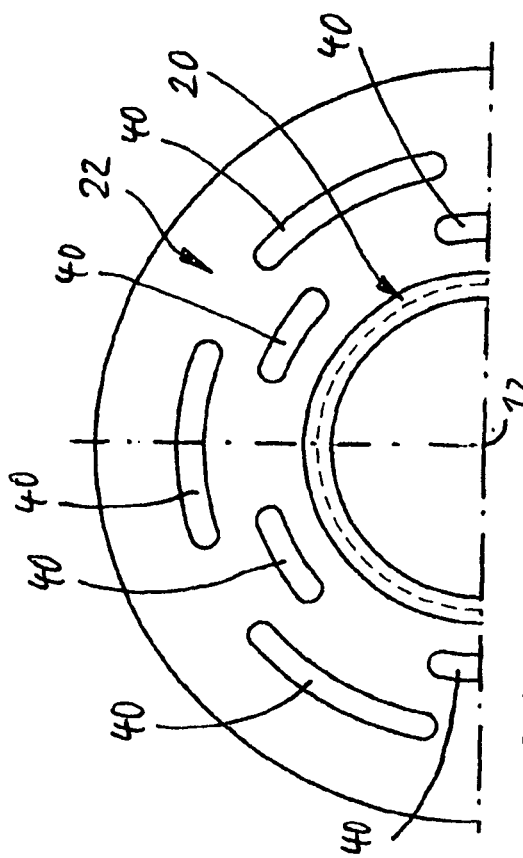
Figure 8:
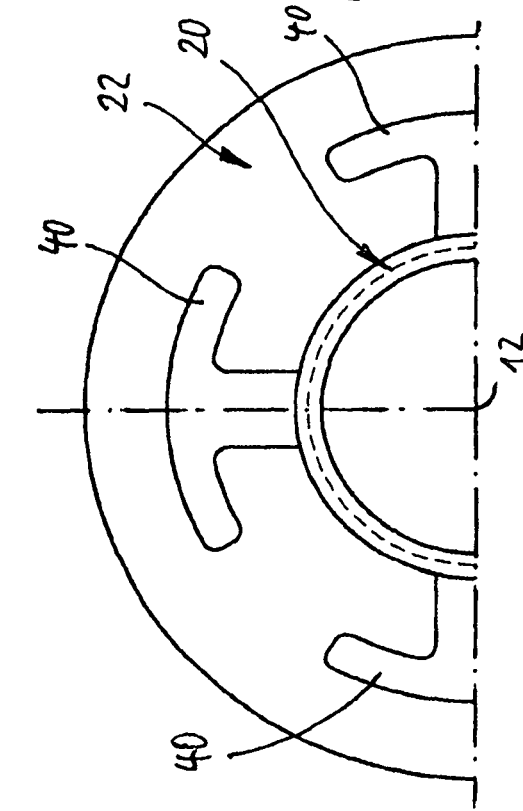

According to three variants in FIGS. 6-6 through 6-8, the cross-sectional flight surface 52 has a first supporting web 62 and a second supporting web 64, wherein the supporting webs 62 and 64 are mostly radially directed. A free space 66 is present between the supporting webs 62 and 64 in the axial direction. In this way, a light-weight and at the same time statically particularly stable construction is created.

A passage opening 68 penetrates at least one of the supporting webs 62 and 64, and is situated in particular in the second supporting web 64 facing away from the scraping side 70 of the screw flight 22.

According to variants in FIGS. 6-9 through 6-12, the profiled cross-sectional flight surface 52 has a first portion 72 extending in the radial direction 16, and a second portion 74 designed to be inclined to the radial direction 16. An angle of inclination 76 or a tilt of this second portion 74 is in this case preferably between 10° and 40°, in particular between 15° and 20°.

According to several variants in FIGS. 6-3, 6-4, 6-11,6-12, 6-17 and 6-18, the profiled cross-sectional flight surface 52 has a third portion 78 which, as seen in cross-section, is curved in the form of a bowl.

The screw hub 20 has likewise been produced at least in part by means of shaping build-up welding using the protective gas welding device 24.

With respect to FIG. 1 on the very left side, the screw hub 20 has in this case a cylindrical first longitudinal portion 80 which serves herein as a second base body for build-up welding. The longitudinal portion 80 itself correspondingly has not been produced by build-up welding, but has been produced in a conventional manner as a tube which has been further turned and milled.

At the longitudinal portion 80, a first bearing support 82 for the screw 10 has been formed by means of turning or a turning method.

The longitudinal portion 80 is followed on the screw hub 20 in the direction of the rotational axis 12 by a frustoconical second longitudinal portion 84 which has been formed by means of shaping build-up welding. In this case, an annular first welding layer 86, and upon this layer, in the direction of the rotational axis 12 or opposite to the axial direction 14, a second welding layer 88 as well as a multitude of further second welding layers have been applied to the longitudinal portion 84.

In the build-up welding of this kind, the first longitudinal portion 80 has been moved and in particular turned, wherein the protective gas welding device 24 then is to be displaced opposite to the axial direction 14 but otherwise is to be moved radially only slightly in order to form the frustoconical shape.

The second longitudinal portion 84 is followed, opposite to the axial direction 14, by a cylindrical third longitudinal portion 92 which is substantially tubular and has been produced conventionally. The longitudinal portion 92 may also be produced advantageously by means of build-up welding and thereby be designed to be grid-shaped. An inlet chamber 94, into which the phase mixture to be clarified can be introduced, is present at the longitudinal portion 92. This inlet chamber 94 is produced in an in particular advantageous manner by means of shaping build-up welding, since individually designed flow surfaces may then be formed thereon.

Outlet openings 96 to be produced in the longitudinal portion 92 in the area of the inlet chamber 94 may be formed advantageously by means of build-up welding.

Radially inside or concentrically to the rotational axis 12, an inlet pipe 98 is present in the area of the longitudinal portion 92. This inlet pipe 98 is likewise advantageously produced by means of shaping build-up welding, so that special flow and guiding surfaces may be formed thereon in a targeted manner.

In FIGS. 7 to 10, various embodiments of passage openings 40 in the respective associated screw flight 22 along with the associated screw hub 20 are illustrated.

In this case, the individual passage opening 40 according to FIG. 7, radially at the center, has a particularly wide portion in the circumferential direction. Through this portion, a middle layer of the phase mixture to be clarified may pass through the screw flight 22 in a targeted manner.

According to FIG. 8, a plurality of passage openings 40 are arranged on two different radii in the radial direction 16. In this case, the radially outer passage openings 40 have a greater width in the circumferential direction than the radially inner passage openings. Also, with this embodiment, material to be clarified of a circumferential layer may pass through the screw flight 22 in a targeted manner.

Figure 9:
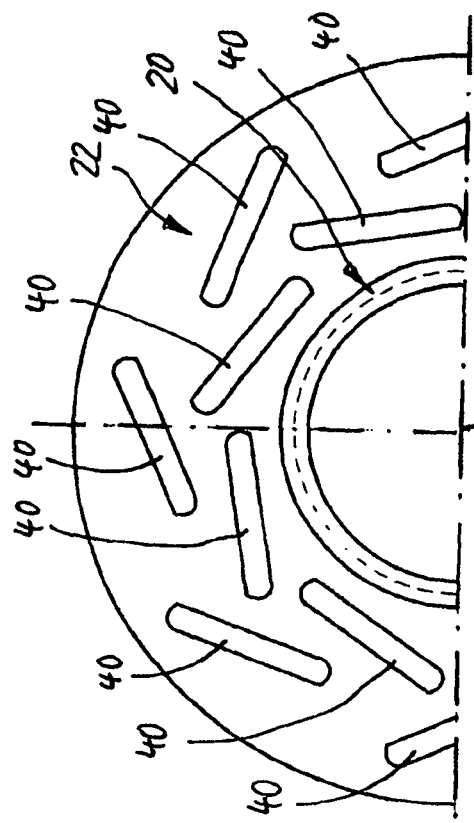

An embodiment is illustrated in FIG. 9, in which the passage openings 40 are wider radially inside than radially outside. This difference in width is designed to be stepped in the circumferential direction. With this embodiment, more material may pass at the screw flight 22 after having reached the radius of the step toward the inside.

Figure 10:
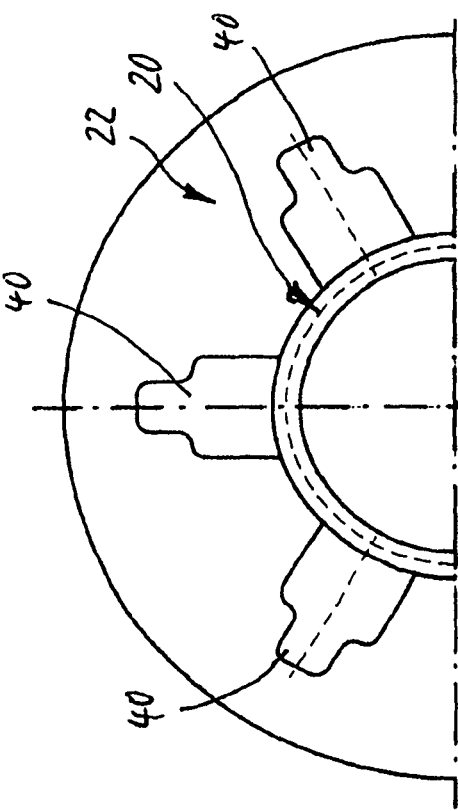

FIG. 10 finally shows an embodiment in which the passage openings 40 are designed as straight slots obliquely inclined to the radial direction 16. When material passes through them, the slots of this kind result in mixing and thus breaking up the material to be clarified.

In conclusion, it should be noted that all of the features mentioned in the application documents and in particular in the dependent claims, despite the formal back reference made to one or more certain claims, should be provided with independent protection even individually or in any combination.

LIST OF REFERENCE NUMERALS

10 screw
12 rotational axis
14 axial direction
16 radial direction
18 drum
20 screw hub
22 screw flight
24 protective gas welding device
28 first welding layer of the screw flight
28 second welding layer of the screw flight
30 welding wire
32 welding gas
34 electric arc
36 flight pitch
38 balancing weight
40 passage opening
42 disc
44 scraper
46 transition
48 flight surface
50 coating
52 cross-sectional flight surface
54 flight foot
56 flight neck
58 flight head
60 scraping edge
62 first supporting web
64 second supporting web
66 free space
68 passage opening
70 scraping side
72 first portion of the cross-sectional flight surface
74 second portion of the cross-sectional flight surface
76 angle of inclination
78 third portion of the cross-sectional flight surface
80 first longitudinal portion of the screw hub
82 first bearing support 84 second longitudinal portion of the screw hub
86 first welding layer at the screw hub
88 second welding layer at the screw hub
92 third longitudinal portion of the screw hub
94 inlet chamber
96 outlet opening
98 inlet pipe

The invention claimed is:

1. A solid-bowl centrifuge screw (10) comprising: a screw hub (20) extending along an axial direction (14) of the screw (10); and a screw flight (22) extending out from the screw hub (20), the screw flight (22) not being a wound sheet metal and having a profiled flight cross-sectional surface (52) with at least one portion of the screw flight (22) defining a curve relative to a radial direction of the screw (10) and with the screw flight (22) having a first thickness at a first radial position thereon relative to the radial direction and a second thickness at a second radial position thereon relative to the radial direction, with the first thickness being different than the second thickness.

2. The solid-bowl centrifuge screw of claim 1, wherein the profiled flight cross-sectional surface (52) has a flight foot (54) in proximity to the screw hub (20) that is thickened as compared to a flight neck (56) that is spaced farther in the radial direction from the screw hub (20) than the flight foot (54).

3. The solid-bowl centrifuge screw of claim 2, wherein the flight cross-sectional surface (52) has a rounding, skew or bevel at a transition (46) to the screw hub (20).

4. The solid-bowl centrifuge screw of claim 2, wherein the flight foot (54) has two supporting webs (62, 64) directed away from the screw hub (20), and a free space (66) is defined between the at least two supporting webs (62, 64) in the axial direction.

5. The solid-bowl centrifuge screw of claim 4, wherein at least one of the supporting webs (62, 64) is permeated by at least one passage opening (68) that completely permeates the screw flight (22).

6. The solid-bowl centrifuge screw of claim 5, wherein the at least one passage opening (68) is only formed only in the supporting web (64) facing away from a scraping side (70) of the screw flight (22).

7. The solid-bowl centrifuge screw of claim 1, wherein the profiled flight cross-sectional surface (52) of the screw flight (22) has a first portion (72) extending in the radial direction of the screw (10) and a second portion (74) that is inclined to the radial direction of the screw (10).

8. The solid-bowl centrifuge screw of claim 1, wherein the flight cross-sectional surface (52) has a flight head (58) and a flight neck (56), the flight head (58) being farther out than the flight neck (56) in the radial direction, and the flight head (58) being thicker than the flight neck (56).

9. A method for producing a solid-bowl centrifuge screw (10) comprising: providing a screw hub (20); and forming a screw flight (22) of the solid-bowl centrifuge screw (10) on the screw hub (20), the screw flight (22) being formed by shaping build-up welding that is carried out so that the screw flight (22) has a profiled flight cross-sectional surface (52).

10. The method of claim 9, wherein the shaping build-up welding is carried out so that at least a portion of the screw flight (22) is curved with respect to a radial direction of the solid-bowl centrifuge screw.

11. The method of claim 9, wherein the shaping build-up welding is carried out so that a thickness of the screw flight (22) is thicker at a first radially distance from an axis from the solid-bowl centrifuge screw than at a second radial distance from the axis of the solid-bowl centrifuge screw.

* * * * *